United States Patent [19]

Yamashita et al.

[11] Patent Number: 5,204,526
[45] Date of Patent: Apr. 20, 1993

[54] MAGNETIC MARKER AND READING AND IDENTIFYING APPARATUS THEREFOR

[75] Inventors: Mitsuo Yamashita, Kawasaki; Kaneo Mohri, Nagoya; Osamu Saito, Kawasaki, all of Japan

[73] Assignee: Fuji Electric Co., Ltd., Kawasaki, Japan

[21] Appl. No.: 837,092

[22] Filed: Feb. 18, 1992

Related U.S. Application Data

[63] Continuation of Ser. No. 307,257, Feb. 7, 1989, abandoned.

[30] Foreign Application Priority Data

| Feb. 8, 1988 | [JP] | Japan | 63-27202 |
| Oct. 25, 1988 | [JP] | Japan | 63-269023 |
| Oct. 26, 1988 | [JP] | Japan | 63-270410 |
| Jan. 11, 1989 | [JP] | Japan | 1-4173 |

[51] Int. Cl.$^5$ .................. G06K 19/10; H01F 1/04; G08B 13/24
[52] U.S. Cl. ...................... 235/493; 148/108; 148/304; 235/487; 340/551; 340/572; 428/900
[58] Field of Search .......... 235/449, 487, 488, 493; 340/551, 572; 428/900; 148/304, 108, 103; 29/607

[56] References Cited

U.S. PATENT DOCUMENTS

| 4,134,538 | 1/1979 | Lagarde et al. | 235/493 X |
| 4,203,544 | 5/1980 | Guilgue | 235/493 X |
| 4,242,789 | 1/1981 | Fox | 235/493 |
| 4,257,830 | 3/1981 | Tsuya et al. | 360/125 |
| 4,510,490 | 4/1985 | Anderson, III et al. | 340/572 |
| 4,553,136 | 11/1985 | Anderson III et al. | 235/493 X |
| 4,568,921 | 2/1986 | Pokalsky | 340/572 |
| 4,598,168 | 7/1986 | Wagner et al. | 340/551 |
| 4,660,025 | 4/1987 | Humphrey | 340/572 |
| 4,727,360 | 2/1988 | Ferguson et al. | 340/572 |
| 4,950,550 | 8/1990 | Radeloff et al. | 340/551 |
| 5,008,649 | 4/1991 | Klein | 340/551 |

FOREIGN PATENT DOCUMENTS 8809979 12/1988 World Int. Prop. O. .

OTHER PUBLICATIONS

Philip E. Wigen, "Wiegand Wire: New Material for Magnetic-Based Devices," Electronics (Jul. 10th, 1975) pp. 100-105.
McGraw-Hill Encyclopedia of Science and Technology, vol. 10 (copyright 1977), p. 27.

*Primary Examiner*—Eugene R. LaRoche
*Assistant Examiner*—Christopher R. Glembocki
*Attorney, Agent, or Firm*—Spencer, Frank & Schneider

[57] ABSTRACT

A magnetic marker has a plurality of thin strips or wires of saturatable magnetic material having square $\phi - H$ characteristics and coercive forces different from each other. Amorphous magnetic material may be used. When the marker is subjected to magnetization reversal by an external magnetic field, variations of magnetic flux corresponding to a plurality of magnetization reversals can be chronologically detected as a voltage pulse train by detecting coils. By processing this voltage pulse train, a pattern can be made, recognized, so that the magnetic marker effectively identifies the kind of article to which it is attached. A magnetic marker reading and identifying apparatus has a plurality of exciting coils for producing a rotating magnetic field, with the axis of at least one of the exciting coils being orthogonal to the axis of at least one other exciting coil. The rotating a.c. magnetic field can be applied to the magnetic marker while the marker passes across the magnetic field irrespective of the position and direction of the marker, with no deviation in the pulse voltage due to leakage flux from the magnetic marker, thereby permitting reliable detection of the pulse train so that the kind and quantity of articles can be identified with high accuracy.

16 Claims, 17 Drawing Sheets

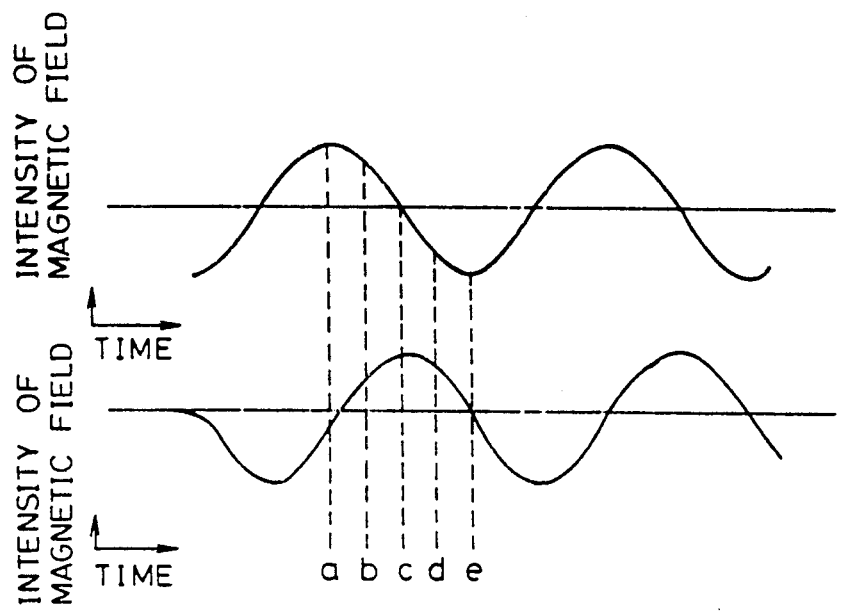
FIG.4A
FIG.4B
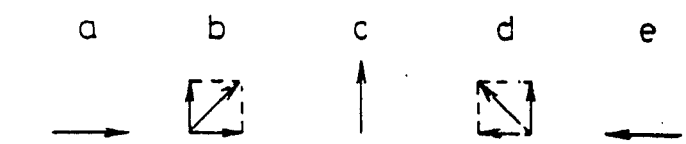
FIG.5

A—1

B—1

A—2

B—2

A-1

B-1

C-1

A-2

B-2

C-2

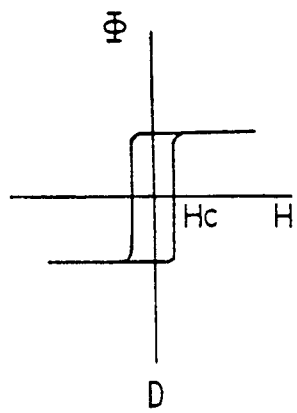
FIG. 16(a)
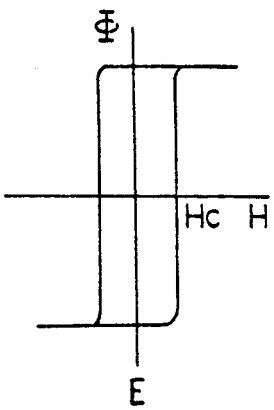
FIG. 16(b)
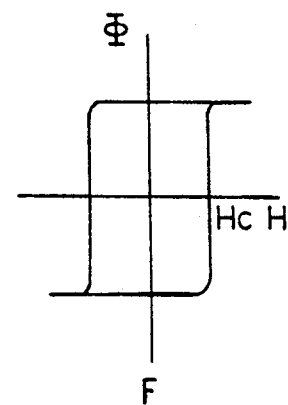
FIG. 16(c)
FIG. 16(d)
FIG. 16(e)
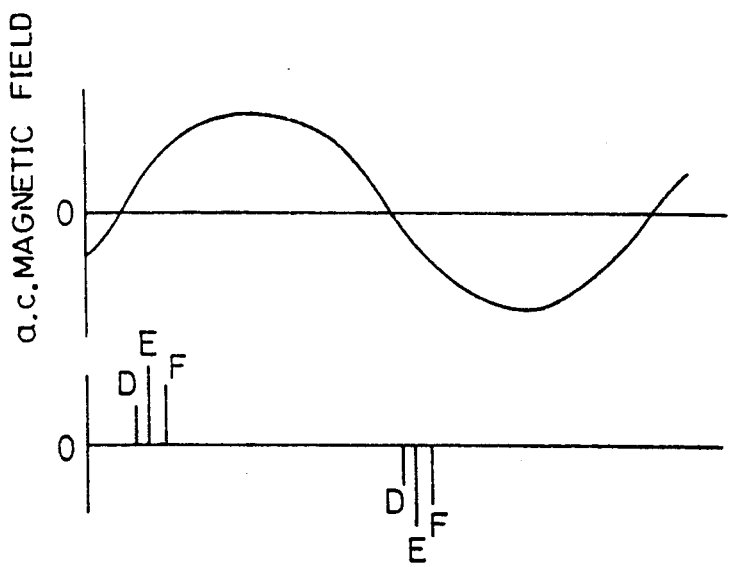

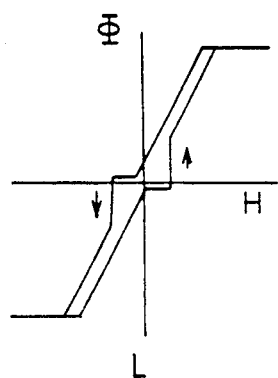
FIG. 17(a)
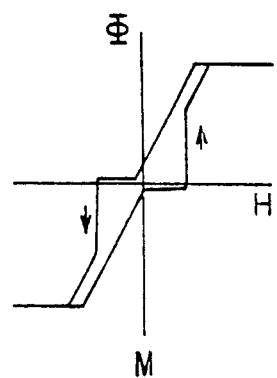
FIG. 17(b)
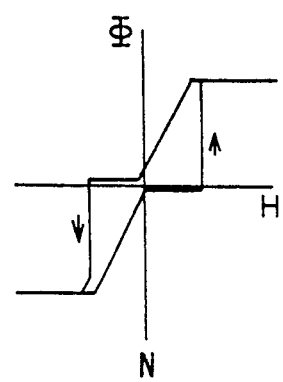
FIG. 17(c)
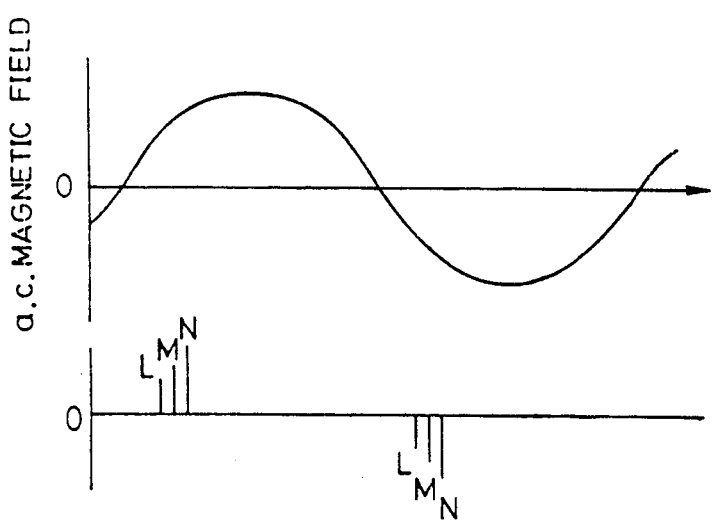
FIG. 17(d)
FIG. 17(e)

1d

1e

1f

MAGNETIC MARKER AND READING AND IDENTIFYING APPARATUS THEREFOR

This application is a continuation of application Ser. No. 07/307,257, filed Feb. 7, 1989, now abandoned.

BACKGROUND OF THE INVENTION

1. Field of the Invention

The present invention relates to magnetic markers applied to articles, for identifying the kind, quantity and the like of the articles, and also relates to a reading and identifying apparatus therefor.

2. Description of the Prior Art

It has been known to apply markers to articles so as to count the number of the articles or to use the markers for burglar-proof measures by reading the markers. Further, it has been desired that such markers are small and cheap. Since these markers are attached to articles in such a way that they are not directly visible in order to prevent the markers from being intentionally or carelessly damaged, magnetism, microwaves and the like have been used for reading the markers. For example, amorphous magnetic thin, strips or fine wires which are read with the aid of magnetic fields, aluminum films which are irradiated with microwaves and the like have been used for the markers. In one particular, system, amorphous magnetic material markers which are applied to the articles to be detected are allowed to pass through an a.c. magnetic field in order to detect variations in the magnetic flux which occur in the amorphous magnetic materials. This system effectively utilizes the soft magnetization characteristics of the amorphous magnetic materials, and has the following desirable features: The markers are not subjected to serious, restrictions on the positions where the markers are attached or the kinds of articles to be detected, and the makers are highly sensitive and can be small and light in weight.

The main portion of a conventional magnetic marker reading and identifying apparatus is schematically shown in FIG. 1. In this figure, a magnetic marker 1 made of amorphous thin strips or fine wires is applied to an article 2 which is set on a belt 4 stretched between two pulleys 3, and is moved in a direction indicated by the arrow as the belt 4 runs. FIGS. 2(A) and 2(B), which are enlarged views, shown an exciting coil 5, an a.c. oscillator 6, detecting coils 7 and a measuring instrument 8. The exciting coil 5 for generating an a.c. magnetic field is connected to the a.c. oscillator 6 The detecting coils 7 detect, as an induced voltage, variations in the magnetic flux in association with a reversal of magnetization of the magnetic marker 1. The detecting coils 7 are connected to the measuring instrument 8, which identifies a voltage pulse train produced in the detecting coils 7 by means of, pattern recognition. Twin coils are used for the detecting coils 7 in order to cancel out induced voltage produced in the detecting coils 7.

The magnetic marker is composed of a plurality of magnetic thin strips or fine wires which are made of a Co base amorphous alloy or the like. However, a magnetic marker 1 which is fixed on a plastic element can be used for the same purpose.

In this apparatus, when a plurality of articles 2, i.e. objects to be detected, on which the magnetic markers 1 are applied pass over the exciting coil 5, being conveyed by the belt 4 as shown in FIG. 1, voltage pulses produced in the detecting coils 7 according to the a.c. magnetic field generated by the exciting coil 5 are detected, and the kinds of the articles are identified by the measuring instrument 8.

The above-mentioned magnetic marker made of amorphous magnetic materials is usable, but still offers the following problems which should be solved:

First, the identifying ability of the marker is a matter of concern. Conventionally, such markers are composed of fine strips or thin wires which are made of materials having one and the same magnetic characteristics. Therefore only data as to whether the marker or the article is present or not and as to the number of articles can be obtained by measuring voltage pulse produced by the magnetic field, but sorted articles cannot be identified. It would be desirable, for example, to use such markers for sorting and counting several identical products for each manufacturer. Accordingly, it would be advantageous to improve the arrangement and the manner of use of markers.

Second, a rapid variation of the magnetic flux is preferable, when the variation in the magnetic flux which is, generated in the amorphous magnetic substance due to the a.c. magnetic field is detected as an induced voltage by the detecting coils, because a steep voltage pulse can that be obtained in the detecting coils. A steep voltage pulse would make the detection of the voltage pulse easy and would substantially avoid effects by magnetic field disturbance. In order to produce a rapid variation in the magnetic flux, it is necessary to use a magnetic material which has $\Phi$(magnetic flux) − H(magnetic field) magnetic hysteresis characteristic showing a square hysteresis loop. The shape of the magnetic material must be determined so as to decrease the demagnetizing field in order to maintain the square hysteresis loop characteristic. That is, the shape of the marker should be selected so that its length is sufficiently large in comparison with the width thereof. As a result, the size of the marker becomes larger as a whole.

Further, the installation condition of the exciting coil 5 causes a problem in the conventional magnetic marker reading and identifying apparatus shown in FIG. 1. That is, only one exciting coil is disposed below the belt 4 on which articles 2 are set. Since the positions and directions of the articles on which the magnetic markers 1 are applied are not always uniform on the belt 4, the outputs which are delivered from the detecting coils 7, when the magnetic markers 1 passes through the a.c. magnetic field area effected by the exciting coil 5, vary in response to the positions and directions of the articles on the belt so as to be unstable.

SUMMARY OF THE INVENTION

The present invention has been devised in view of the above-mentioned facts, and therefore, an object of the present invention is to provide a small magnetic marker which is adapted to be applied to an article and which is constituted such that not only the presence of an article can be detected, but also the kind (sort) of the article can be identified.

Another object of the present invention is to provide a magnetic marker reading and identifying apparatus which can extract a stable output voltage from detecting coils irrespective of the position and direction of the article bearing the magnetic marker.

In the first aspect of the present invention, a magnetic marker adapted to be applied on an object to be detected passing through an a.c. magnetic field, comprises a plurality of long and narrow magnetic substances having square magnetic hysteresis characteristics or magnetic flux jumping characteristics and also at least having magnetic coercive forces which are different from each other, the magnetic substances being arranged in a direction orthogonal to the longitudinal direction thereof at predetermined intervals.

Here, plurality of long and narrow magnetic substances may include those having equal magnetic flux upon application of the a.c. magnetic field, in combination.

The plurality of long and narrow magnetic substances may include those having different magnetic flux upon application of the a.c. magnetic field, in combination.

The plurality of long and narrow magnetic substances may have saturated magnetic flux densities which are equal to each other but have cross-sectional areas which are different from each other.

The plurality of long and narrow magnetic substances may have cross-sectional areas which are equal to each other but have saturated magnetic flux densities which are different form each other.

The plurality of long and narrow magnetic substances may be thin magnetic strips.

The plurality of long and narrow magnetic substances may be magnetic fine wires.

The magnetic fine wire may have a two layer stress structure composed of an outer surface layer in which compressive stress exists and a core layer in which tensile stress exists, the outer surface layer and the core layer being concentric with each other.

In accordance with a second aspect of the present invention, a magnetic marker reading and identifying apparatus comprises:

means for conveying an object to be detected to which a magnetic marker is attached;

first means for producing an a.c. magnetic field in the conveying direction of the conveying means;

second means for producing an a.c. magnetic field orthogonal to the conveying direction of the conveying means; and measuring means for detecting voltage pulses due to variations of magnetic flux produced in the magnetic marker so as to identify the magnetic marker.

Here, the first a.c. magnetic field producing means may include a first a.c. oscillator and the second a.c. magnetic field producing means may include a second a.c. oscillator, the and phases of the a.c. currents from the first and second a.c. oscillators being different from each other by 90 deg.

The conveying means may include a belt which is adapted to pass through a first exciting coil in the first a.c. magnetic field producing means.

The measuring means may include first and second detecting coils which are twin and which are disposed above and below the belt at distances to the latter which are different from each other.

The apparatus may further comprise:

third means, including a third exciting coil disposed so as to face the first exciting coil, for producing an a.c. magnetic field; and fourth means, including a fourth exciting coil disposed so as to face the second exciting coil, for producing an a.c. magnetic field.

The magnetic marker according to the present invention may be composed of a plurality of magnetic thin strips, or a plurality of fine wires each having an outer surface layer and a center layer which have stress distributions different from each other. The magnetic substances have square magnetic hysteresis characteristics and are arranged parallel to one another in a direction orthogonal to the longitudinal direction of the strips or wires. The magnetic substances of the strips or the wires have coercive forces which are different from each other, and may also have different cross-sectional areas so that the maximum magnetic fluxes produced in each upon application of the magnetic field are different from each other, whereby the phases of the reversal of magnetization and the values of the magnetic flux become different from each other among the strips or wires upon the application of an external magnetic field so that respective, inherent voltage pulse trains can be obtained. These voltage pulse trains are subjected to pattern recognition by means of an instrument for determining the sorts of the markers.

Further, wires which have high magnetic striction and which are subjected to a drawing process or the like so as to have a two layer structure composed of an outer surface layer and an inner layer that are applied with a compressive stress and a tensile stress, respectively, may be used to enhance the critical field of magnetic flux reversal in an a.c. magnetic field so that a rapid reversal of magnetization takes place with less effect by the demagnetizing field, resulting in the possible use of relatively short magnetic fine wires, so that it is possible to make the marker small.

The magnetic marker reading and identifying apparatus according to the present invention may have more than two ,exciting coils to which a.c. currents having phases which are shifted from each other by 90 deg. are applied, and accordingly, a rotating magnetic field that is the resultant of an a.c. magnetic field which is parallel with the advancing direction of the magnetic marker and an a.c. magnetic field which is orthogonal to the same direction can be applied to the magnetic marker. Accordingly, even though the position and direction of the article on which the magnetic maker is applied may vary, the resultant magnetic field acts upon the marker at least once in the longitudinal direction thereof, so that voltage pulses can be reliably detected without deviation.

The above and other objects, effects, features and advantages of the present invention will become more apparent from the following description of embodiments thereof taken in conjunction with the accompanying drawings.

BRIEF DESCRIPTION OF THE DRAWINGS

FIGS. 4A and 4B illustrate a.c. magnetic field wave forms produced by two exciting coils, respectively;

FIG. 5 illustrates a.c. magnetic field vectors at each time point, respectively;

FIGS. 10(a) to 19(d) illustrate Φ−H curves of the thin magnetic strips. illustrated in FIGS. 9(a)-9(c);

FIGS. 16(a)-16(c) illustrate Φ−H curves and FIG. 16(e) illustrates a pulse output-time diagram produced in the detecting coil of a magnetic marker made of three kind of magnetic materials having coercive forces and saturated magnetic fluxes which are different from each other, respectively, while FIG. 16(d) illustrates an a.c. magnetic field waveform;

FIGS. 17(a)-17(c) illustrate Φ−H curves and FIG. 17(e) illustrates a pulse output-time diagram of thin magnetic trips having magnetic flux jumping characteristics, while FIG. 17(d) illustrates an a.c. magnetic field waveform;

FIG. 19 is a partly cutaway perspective view showing an element to be detected having a magnetic marker, according to the present invention, which is composed of fine magnetic wires each having two stress layers;

DETAILED DESCRIPTION OF PREFERRED EMBODIMENTS

Figure 1:
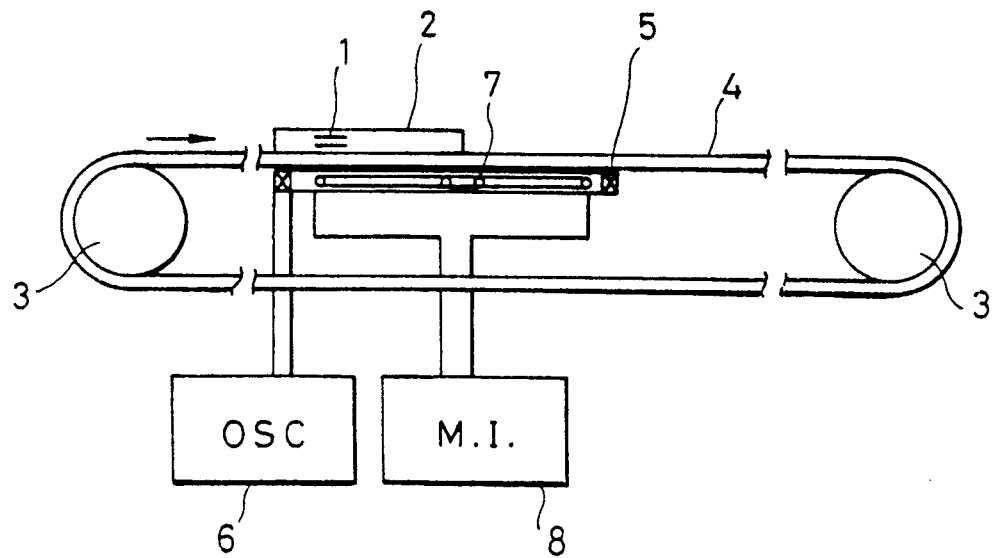
FIG. 1 is a schematic side view illustrating the main part of a conventional magnetic marker reading and identifying apparatus.
Figures 2A, 2B:
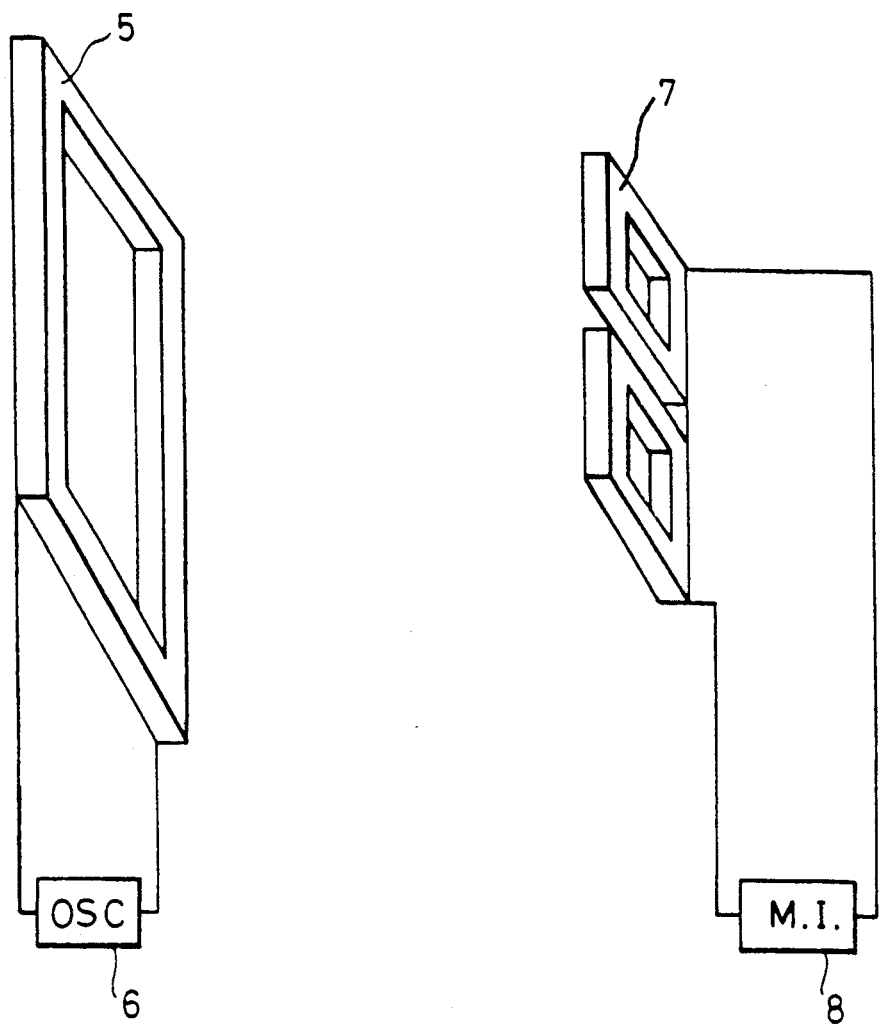
FIG. 2A and 2B are enlarged views illustrating parts of the apparatus shown in FIG. 1.
Figure 3:
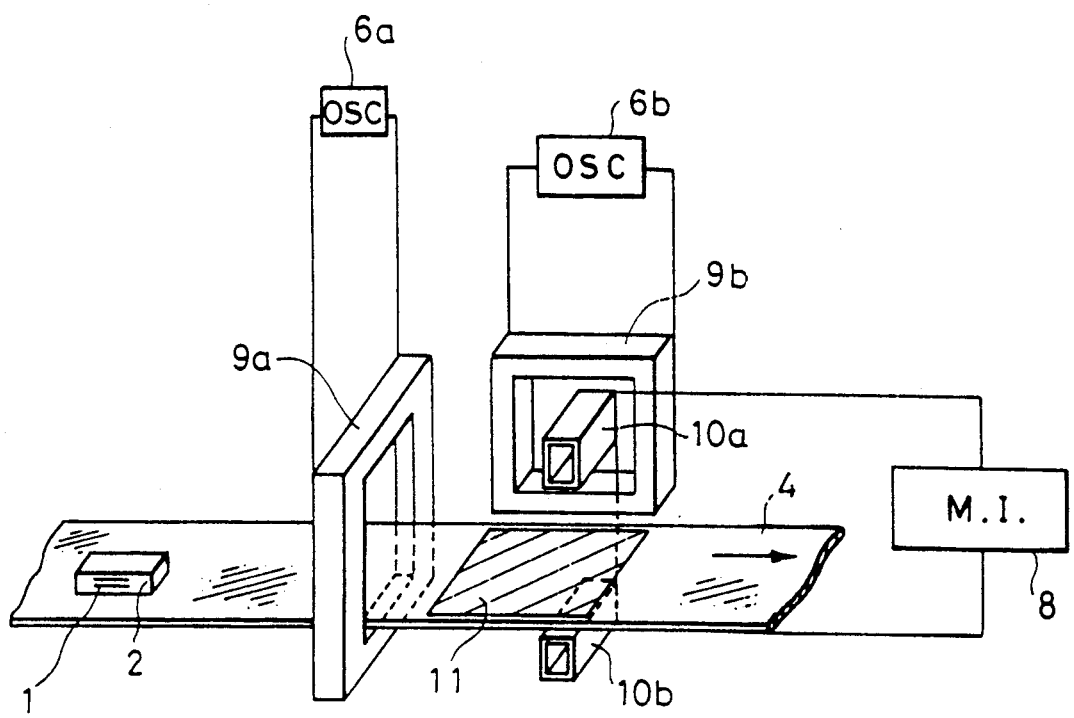
FIG. 3 is a schematic perspective view illustrating an embodiment of a magnetic marker reading and identifying apparatus according to the present invention.

Embodiments of the present invention will be described hereinbelow:

In FIG. 3, which is a schematic perspective view illustrating part of a magnetic marker reading and identifying apparatus in which exciting coils according to the present invention are provided, like reference numerals are given to like parts shown in FIG. 1. In FIG. 3, two exciting coils are provided, that is, a first exciting coil 9a and a second exciting coil 9b. the exciting coils 9a and 9b are positioned in an L-like arrangement as viewed in a plan view of belt 4. The belt 4, on, which, an article 2 thereon with a magnetic marker 1 made of amorphous magnetic substance is set, runs through the first exciting coil 9a in the direction indicated by the arrow, and the second coil 9b is arranged on one side of the belt 4. The first exciting coil 9a is connected to a first a.c. oscillator 6a while the second exciting coil 9b is connected to a second a.c. oscillator 6b.

Figure 6:
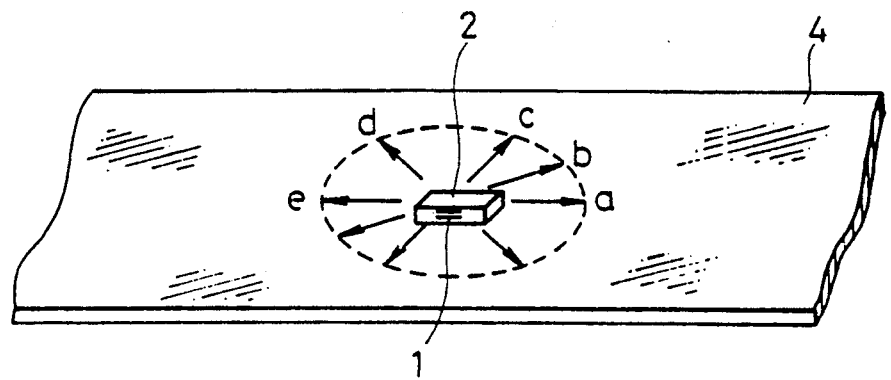
FIG. 6 shows a.c. magnetic field vectors having starting points coincident with each other.

Detecting coils 10a and 10b which are positioned above and below the belt 4, and which are twin so that electromotive forces induced by the first and second exciting coils 9a and 9b are canceled out, are both connected to a measuring instrument 8. In this arrangement, when a.c. current is applied to the two first and second exciting coils 9a and 9b, an a.c. rotating magnetic field is produced in the shaded area 11. The phases of the a.c. currents applied respectively to the first and second exciting coils are shifted from each other by 90 deg., these a.c. magnetic field waveforms being shown in FIG. 4. FIGS. 4A and 4B show the a.c. magnetic field waveforms provided by the first and second exciting coils 9a and 9b, respectively., in which each ordinate indicates the intensity of the magnetic fields and each abscissa indicates time. Accordingly, when the magnetic marker 1 passes over the area 11 in which the a.c. rotating magnetic field is produced, the a.c. magnetic field applied to the magnetic marker 1 is the resultant of the a.c. magnetic fields shown in FIGS. 4A and 4B, respectively. In this case, the a.c. magnetic field produced by the first exciting coil 9a is applied to the magnetic maker 1 in parallel with the advancing direction of the latter while the a.c. magnetic field produced by the second exciting coil 9b is applied to the marker 1 in a direction, orthogonal to the advancing direction of the same. Accordingly, the a.c. magnetic field applied to the magnetic marker 1 at the time points a, b, c, d and e, which are commonly shown in FIGS. 4A and 4B, are shown by vectors in FIG. 5. It is found that this magnetic field is a rotating magnetic field resultant of the a.c. magnetic fields which are produced by the first and second exciting coils 9a and 9b. Further, in the arrangement according to the present invention in which two exciting coils are provided, the speed of the belt 4 is so adjusted that the cycle period T of the rotating magnetic field becomes more than 1, that is, the a.c. magnetic field turns by more than one revolution during the magnetic marker passage over the area 11 where the rotating magnetic field is produced. If the starting points of the vectors of the a.c. magnetic field are made to be coincident with the center point of the magnetic marker 1, time variations in the direction and intensity of the a.c. magnetic field at that point are shown as the vectors in FIG. 6, and the dotted line shows the a.c. rotating magnetic field. The points a, b, c, d and e shown in FIG. 6 correspond to the points a, b, c, d and e shown in FIGS. 4 and 5.

Figure 7:
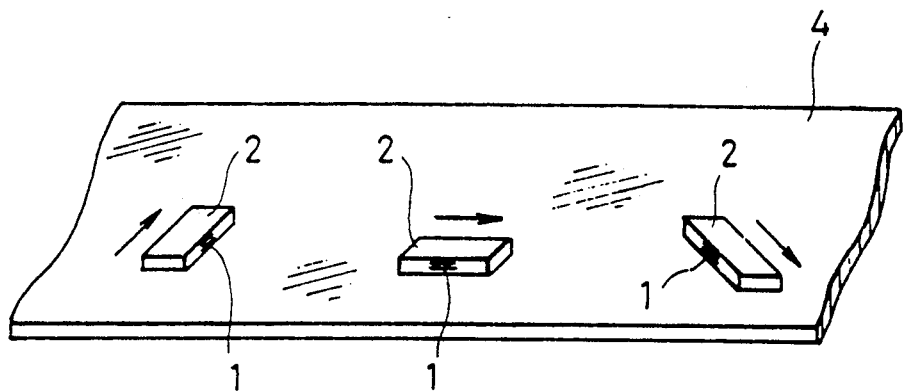
FIG. 7 is a schematic view exemplifying the positional relationship of articles on which magnetic makers are applied.

FIG. 7 exemplifies a positional relationship such that the longitudinal direction of the magnetic marker, as indicated by the arrow, is not in parallel with the advancing direction of the belt 4. In any case, the a.c. magnetic field can be applied at least once to the magnetic marker in the longitudinal direction thereof during the passage of the magnetic marker 1 over the area 11 where the rotating magnetic field is produced. This makes it possible to produce voltage pulses which are effected by variations of the magnetic flux in the longitudinal direction of the magnetic marker 1, and therefore stable outputs can be detected from the detecting coils 10a and 10b shown in FIG. 3. In addition, the detecting coils 10a and 10b are twin coils as mentioned above, and are positioned at different distances from the magnetic marker 1 (or in other words, from the belt 4) since, if these distances were equal to each other, voltage pulses due to variations of magnetic flux in the magnetic marker would be canceled out. Further, adjustments are made so that induced electromotive forces produced in the detecting coils 10a and 10b by the first and second exciting coils 9b and 9a become zero before the magnetic marker 1 enters into the area 11 where the a.c. rotating magnetic field is produced.

Figure 8:
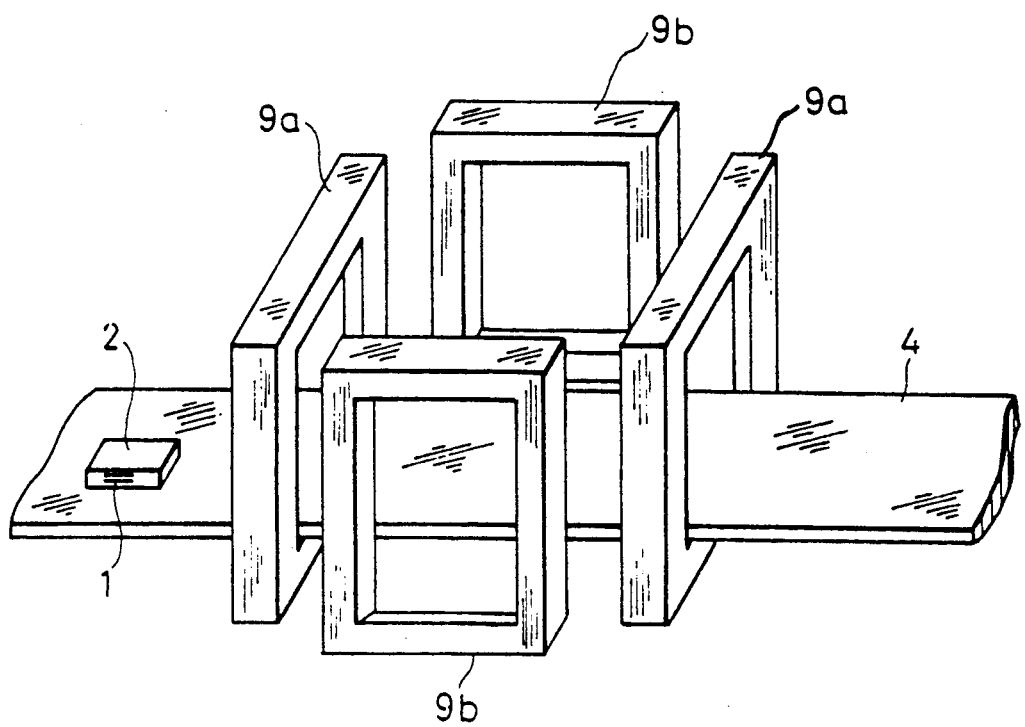
FIG. 8 is a schematic perspective view exemplifying an arrangement of the exciting coils in another embodiment of the magnetic marker reading and identifying apparatus according to the present invention.

FIG. 8 is a schematic perspective view illustrating an arrangement of four exciting coils, in which there are detecting coils (not shown) that may be arranged above and below the belt 4 as in the embodiment shown in FIG. 3. In FIG. 8, there are two exciting coils corresponding to the first exciting coil 9a through which the belt 4 passes, and two exciting coils corresponding to the second exciting coil 9b which is positioned to the side of the belt 4 so as to form an L-like arrangement in combination with the first exciting coil 9a, the coils corresponding to the first exciting coil 9a are opposed to each other and the coils corresponding to the second exciting coil are also opposed to each other, thereby providing an arrangement with a total of four exciting coils. If two pairs of first and the second exciting coils 9a and 9b are used in combination, as in FIG. 8, the diversion of the magnetic flux is small in the area 11 (not marked in FIG. 8) where the a.c. rotating magnetic field is produced, in comparison with that in the area shown in FIG. 3. Accordingly, two-directional parallel magnetic fields can be surely and uniformly applied so that a rotating magnetic field is produced uniformly over the area. As a result, even if the magnetic marker is located in any position widthwise of the belt 4, it is uniformly magnetized, and therefore very stable voltage pulse can be detected- from the detecting coils (.which are not shown in FIG. 8).

Figure 9A:
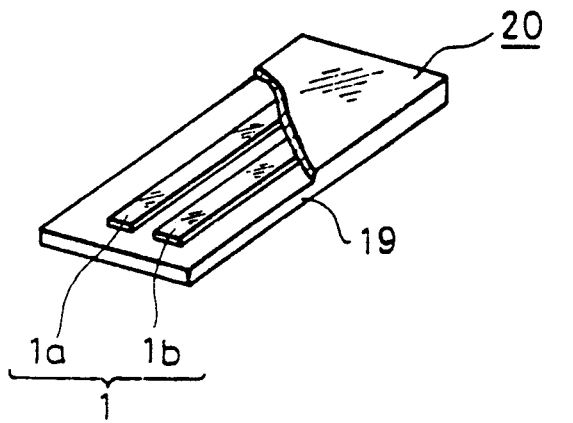
FIGS. 9(a) to 9(c) are partly cutaway perspective views showing elements to be detected each having a magnetic marker composed of two thin magnetic strips, according to the present invention.
Figure 9B:
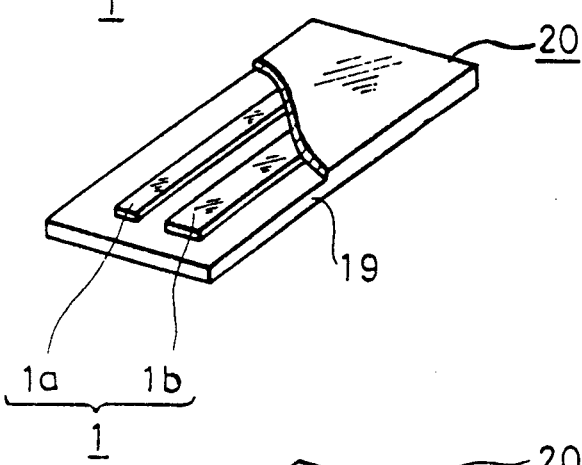
Figure 9C:
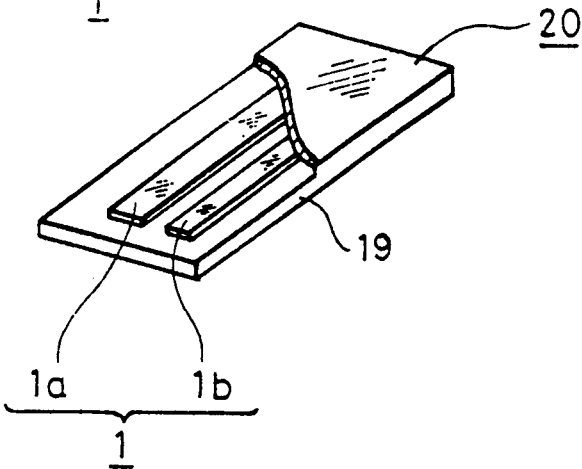
Figure 10A:
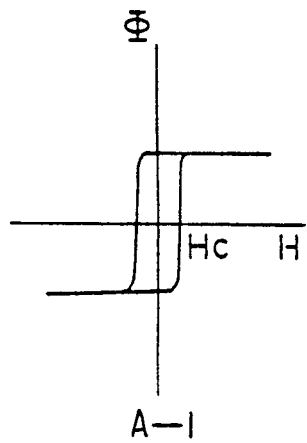
Figure 10B:
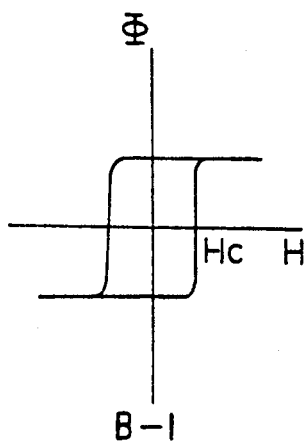
Figure 10C:
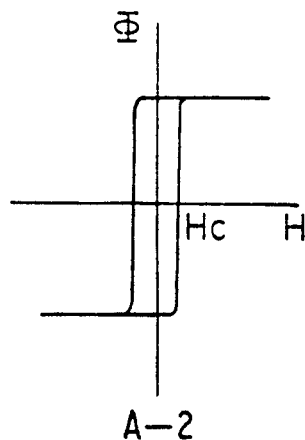
Figure 10D:
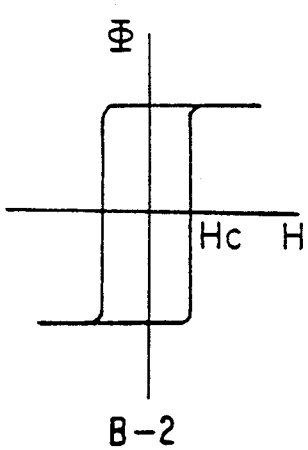

Next, the arrangement of the magnetic marker and the function thereof will be described hereinbelow:

FIGS. 9(a), 9(b), and 9(c) are a partly cutaway perspective views illustrating elements 20 to be detected having the magnetic marker 1. In these Figures, reference numerals 1a, 1b denote thin magnetic strips whose magnetic flux ($\Phi$) —magnetic field (H) (hereinafter referred to as $\Phi-H$) curves are shown in FIGS. 10(a)-10(d).

In FIGS. 9(a)-9(c), two thin magnetic strips 1a and 1b are arranged at a predetermined interval in the direction orthogonal to the longitudinal direction of the magnetic marker, and are held between fixing plates 19 such as thin plastic plates or the like so as to form the element 20 to be detected. Each of the thin magnetic strips 1a and 1b has a length of, for example, about 50 mm. For each element 20 to be detected, the widths of the thin magnetic strips 1a and 1b shown in FIG. 9(a) are equal to each other, that is, 2 mm. However, the thin magnetic strips 1a and 1b shown in FIG. 9(b) are selected so that the cross-sectional area of the thin magnetic strip 1b is 1.5 times as large as that of the thin magnetic strip 1a, while the cross-sectional area of the thin magnetic strip 1a is 1.5 times as large as that of the thin magnetic strip 1b shown in FIG. 9(c).

The thin magnetic strips 1a and 1b having square $\Phi-H$ characteristics are made of materials having other excellent magnetic characteristics, such as a Co base amorphous alloy or the like, and they should have coercive forces Hc which are different from each other.

When material having an equal saturated magnetic flux density is used, the maximum magnetic flux can be made to be different from each other by changing the cross-sectional area of one of the thin magnetic strips 1a and 1b, as shown, for example, in FIGS. 9(b) and 9(c). As to the $\Phi-H$ curves of the thin magnetic strips 1a and 1b, in FIGS. 10(a)-10(d) A-1 and A-2 denote the strip 1a and B-1 and B-2 denote the strip 1b. Since the cross-sectional areas of the thin magnetic strips 1a and 1b shown in FIG. 9(a) are equal to each other, the hysteresis characteristics of the magnetic flux ($\Phi$) magnetic field (H) of A-1 and B-1 exhibit one and the same maximum magnetic flux. The cross-sectional area of the thin magnetic strip 1b is 1.5 times as large as that of the strip 1a in FIG. 9(b) so that the, $\Phi-H$ characteristics are a combination of A-1 in FIG. 10(a) and B-2 in FIG. 10(d). Further, the cross-sectional area of the thin magnetic strip 1a is 1.5 times as large as that of the strip 1b in FIG. 9(c), so that the $\Phi-H$ characteristics are combination of A-2 in FIG. 10(c) and B-1 in FIG. 10(b).

Figure 11A:
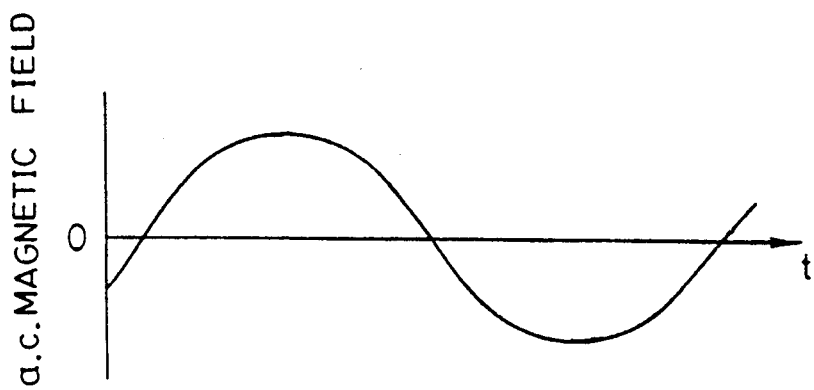
FIG. 11(a) illustrates an ac. magnetic field waveform
Figure 11B:
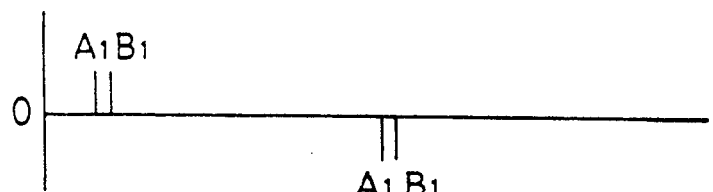
FIGS. 11(b)-11(d) are voltage-time diagram illustrating pulse voltage trains each produced in a detecting coil according to the present invention.
Figure 11C:
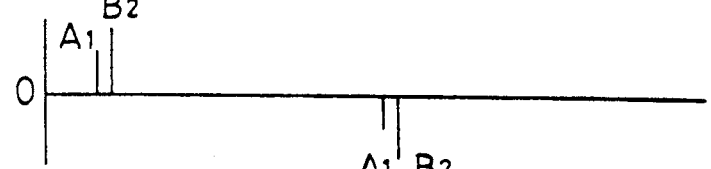

Next, an explanation will be presented of the voltage pulse trains which are produced in the detecting coils 10 when an article 2 bearing the abovementioned magnetic marker 1 is allowed to pass through the magnetic field. In FIG. 11(a) which shows an a.c magnetic field waveform and FIGS. 11(b)-11(d), which illustrate pulse outputs from the elements to be detected shown in FIGS. 9(a)-9(c), the pulse outputs of the thin magnetic strips 1a and 1b are shown as A, and B, respectively. FIGS. 11(a), 11(b), 11(c) and 11(d) show chronological voltage pulse trains which are produced in the detecting coils 10 in accordance with the magnetization reversal order, which corresponds to differences in coercive force, of each of the thin magnetic strips. FIGS. 11(a), 11(b) and 11(c) are obtained from the elements to be detected shown in FIGS. 9(a), 9(b) and 9(c), respectively. That is, pulse outputs can be obtained which correspond to the magnetic flux variations by making a combination of the thin magnetic strips 1a and 1b having the $\phi-H$ characteristics shown in FIGS. 10(a)-10(d).

A method for recognizing the voltage pulse trains will be described below.

When an element 20 to be detected, having the marker 1 passes through an a.c. magnetic field, the marker does not always lie in one direction with respect to the a.c. magnetic field. Accordingly, the levels of the pulse outputs detected by the detecting coils 10 depend upon the longitudinal vector component of the marker 1 in the a.c. magnetic field. Therefore, the output levels may possibly vary each time when a marker 1 passes through the a.c. magnetic field, so that it is difficult to recognize the voltage pulse trains at the output levels detected. With the use of a conventional magnetic marker reading and identifying apparatus, the abovementioned problem can be solved using the following methods. In the first method, the voltage pulse trains are recognized by comparing the output levels thereof ($a_1$, $a_2$, $b_1$, and $B_2$ in FIGS. 11(b) to 11(c) with respect to each other. For example, using the first outputs $(A_1)_1$ and $(B_1)_1$ which are chronologically indicated, as reference values, the n-th outputs $(A_1)_n$ and $(B1_1)_n$ are nondimensionalized as $(A_1)_n/(A_1)_1$ and $(B_1)_n/(B_1)_1$. According to this method, the patterning of the voltage pulse trains is possible without being affected by the direction of the magnetic marker. In the second method, by integrating the voltage pulse $e(\propto d_{100}/dt)$, the patterns shown in FIGS. 12(b)-12(d) can be chronologically obtained. FIGS. 12(b), 12(c) and 12(d) show the results of integration of the voltage pulses in FIGS. 9(b), 9(c) and 11(d), respectively. In the first nondimensionalizing method, the voltage pulse trains are numerically recognized. On the other hand, in the second integrating method variations of the magnetic flux Φ in association with the increase or decrease of magnetic flux are recognized as a pattern. In this case the first integrated value is used as a reference value so that the second, third .... n-th values are nondimensionalized, and therefore, a stable pattern can be obtained for every sorting marker without being affected by the direction of the marker with respect to the eternal a.c. magnetic field.

Figure 14A:
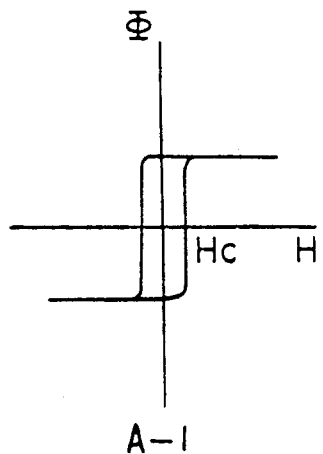
FIGS. 14(a)-14(f) illustrates Φ−H curves of the thin magnetic strips shown in FIGS. 13(a)-13(g)
Figure 14B:
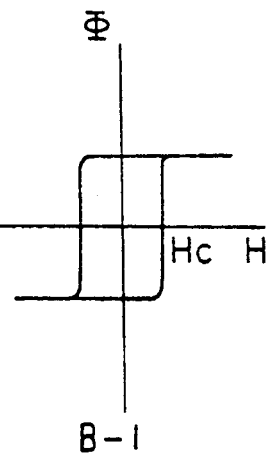
Figure 14C:
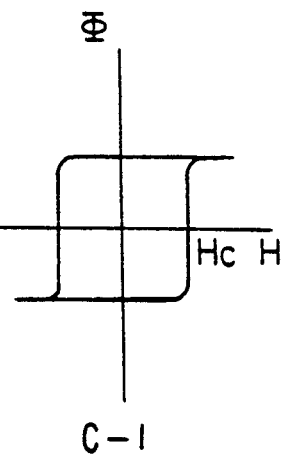
Figure 14D:
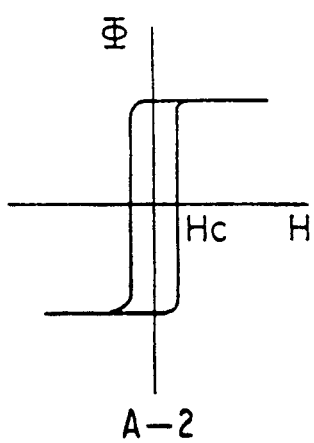
Figure 14E:
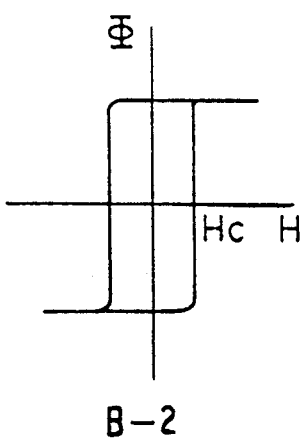
Figure 14F:
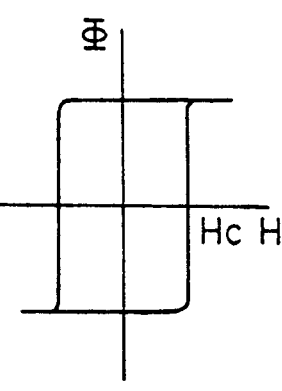
Figure 15A:
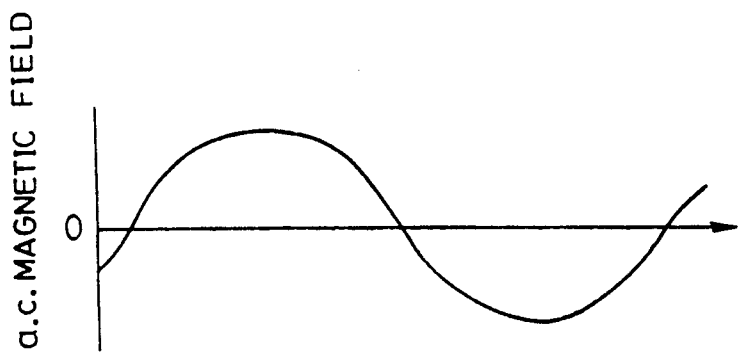
FIG. 15(a) illustrates an a.c. magnetic field waveform
Figure 15B:
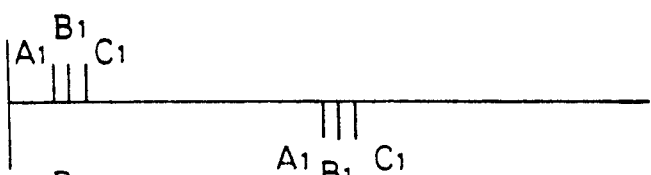
FIGS. 15(b) to 15(h) are voltage-time diagrams illustrating pulse voltage trains each produced in the detecting coil according to the present invention.
Figure 15C:
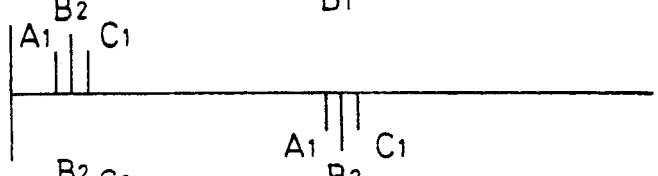
Figure 15D:
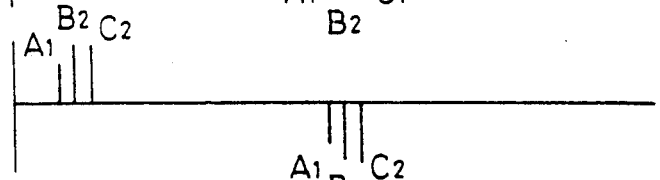
Figure 15E:
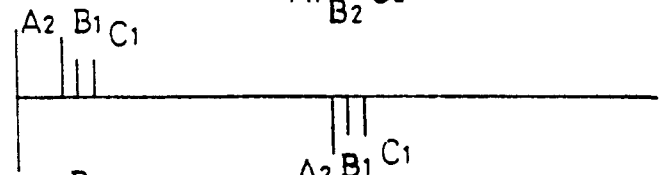
Figure 15F:
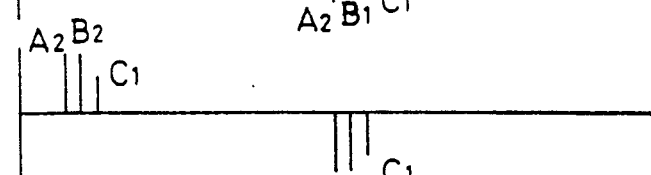
Figure 15G:
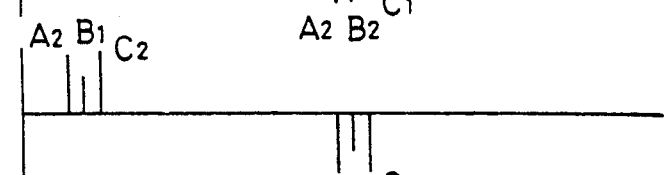
Figure 15H:
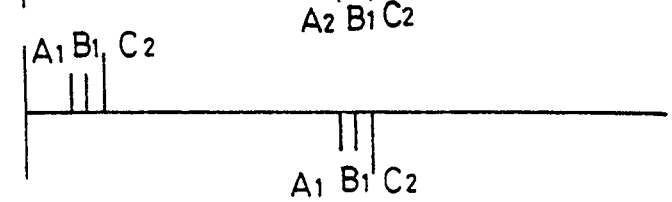

The above-mentioned recognizing methods are unnecessary in the magnetic marker reading and identifying apparatus according to the present invention, in which a rotating a.c. magnetic field is utilized. It has already been explained with examples, that the marker is composed of two kinds of thin magnetic strips 1a and 1b having different coercive forces and the cross-sectional areas of which are changed so as to form the element 20 to be detected, and that the pulse outputs due to variations in flux are detected It is noted here that, according to the present invention, the number of things that are to be identified can be increased by increasing the number of thin magnetic strips having different magnetic coercive forces and by changing the cross-sectional areas of the strips. Examples are shown in FIGS. 13(a) to 15(h), which resemble FIGS. 9(a) to 11(d). Identical reference numerals are used in these figures in order to facilitate comparison between the former and the latter. Since the magnetic markers shown in FIGS. 13(a)-13(g) which are composed of three, thin magnetic strips, including an additional thin magnetic strip 1c, reference characters C-1, C-2 are shown in FIGS. 14(c) and 14(f), and reference characters C₁, C₂ are shown in FIGS. 15(b) to 15(h).

FIGS. 13(a) to 13(g). element 20 to be detected which are formed by securing a magnetic marker 1, composed of three thin magnetic strips respectively having different magnetic coercive forces, to the fixing plate 19. In this case, seven kinds of magnetic markers 1 can be obtained by combining thin magnetic strips whose cross-sectional areas are increased by 1.5 times, as shown in FIGS. 13(a) through 13(g). Combinations of magnetic strips in the markers expressed by the cross-sectional area ratios are shown in Table 1.

TABLE 1

| Combination | Thin magnetic strip | | |
|---|---|---|---|
| | 1a | 1b | 1c |
| FIG. 13 (a) | 1 | 1 | 1 |
| FIG. 13 (b) | 1 | 1.5 | 1 |
| FIG. 13 (c) | 1 | 1.5 | 1.5 |
| FIG. 13 (d) | 1.5 | 1 | 1 |
| FIG. 13 (e) | 1.5 | 1.5 | 1 |
| FIG. 13 (f) | 1.5 | 1 | 1.5 |
| FIG. 13 (g) | 1 | 1 | 1.5 |

FIGS. 14(a)–14(f) show Φ−H curves which exhibit variations of magnetic flux due to different cross-sectional areas, and which are denoted as A-1, A-2 for the thin strip 1a, B-1, B-2 for thin strip 1b, and C-1, C-2 for thin strip 1c. Combinations of the Φ−H characteristics are shown in Table 2.

TABLE 2

| Combination | Φ − H characteristic |
|---|---|
| FIG. 13 (a) | A-1, B-1, C-1 |

TABLE 2-continued

| Combination | Φ − H characteristic |
|---|---|
| FIG. 13 (b) | A-1, B-2, C-1 |
| FIG. 13 (c) | A-1, B-2, C-2 |
| FIG. 13 (d) | A-2, B-1, C-1 |
| FIG. 13 (e) | A-2, B-2, C-1 |
| FIG. 13 (f) | A-2, B-1, C-2 |
| FIG. 13 (g) | A-1, B-1, C-2 |

Figure 11D:
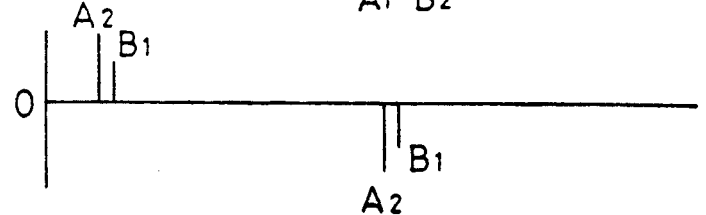
Figure 12A:
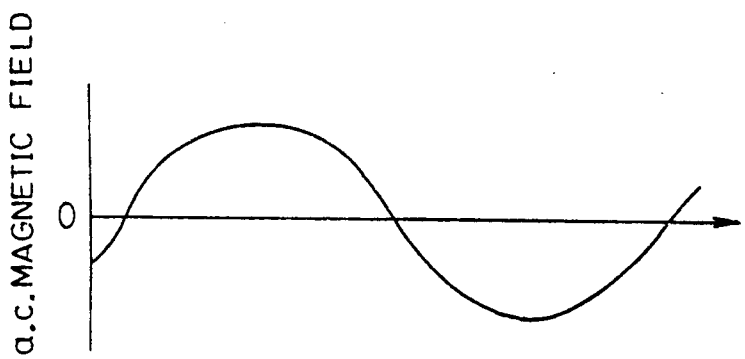
FIG. 12(a) illustrates an a.c. magnetic field
Figure 12B:
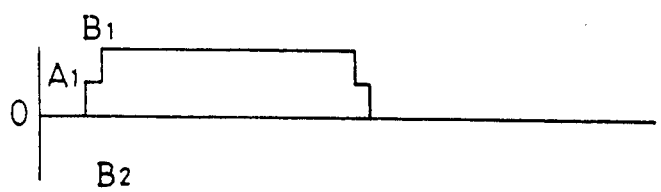
FIGS. 12(b)-12(d) are integral forms of pulse voltage-time diagrams.
Figure 12C:
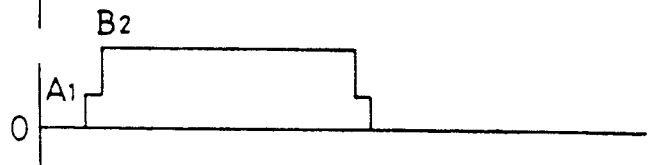
Figure 12D:
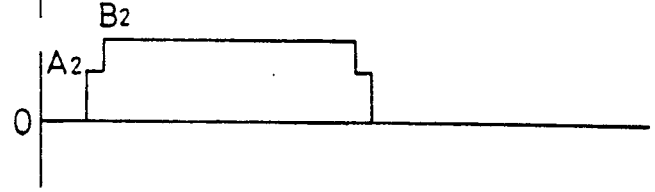
Figure 13A:
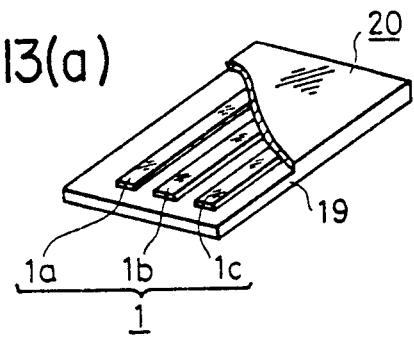
FIGS. 13(a)-13(g) are partly cutaway perspective views showing elements to be detected each having a magnetic marker composed of three thin magnetic strips according to the present invention.
Figure 13E:
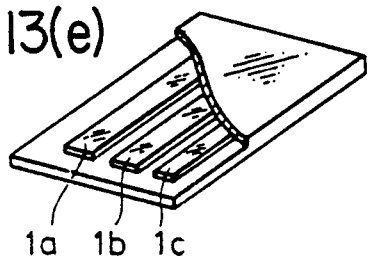
Figure 13B:
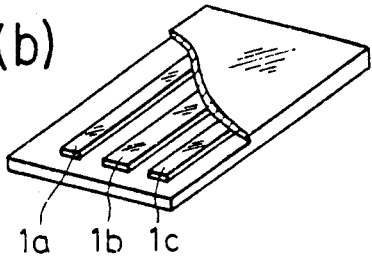
Figure 13F:
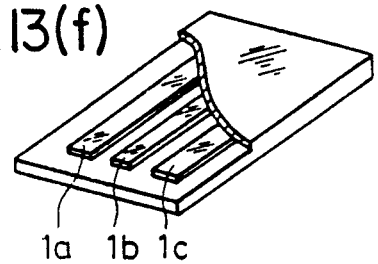
Figure 13C:
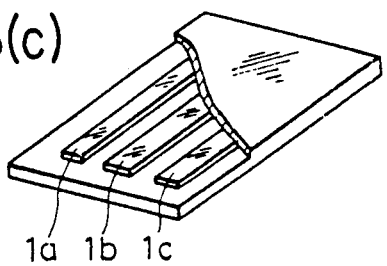
Figure 13G:
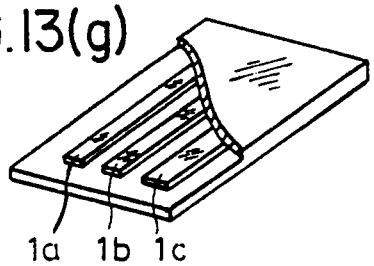
Figure 13D:
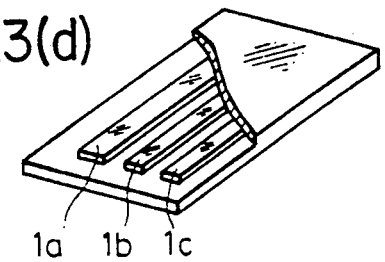

FIGS. 15(b) to 15(h) show the pulse outputs of each of the thin magnetic strips, and are similar to FIGS. 11(b) to 11(d). Seven patterns can be obtained based on the combinations shown in FIGS. 13(a) to 13(g) and FIGS. 14(a) to 14(f).

As mentioned above, with a magnetic marker composed of a plurality of thin magnetic strips having different coercive forces Hc but identical saturated magnetic flux densities Bs, by combining the thin magnetic strips which have different cross-sectional areas from each other, (that is, which have different magnetic flux values which are produced in the strips upon application of a magnetic field) it is possible to determine the kind of pattern of the voltage pulses train inherent to the magnetic marker. This facilitates the identification of articles Further, according to the present invention, it is possible to use a plurality of magnetic materials originally having different coercive forces Hc and saturated magnetic flux densities Bs. An example of this is shown in FIGS. 16(a)–16(e) using, three magnetic materials D, E and F. In these Figures, the ϕ−H curves of the materials D, E and F and the pulse output pattern are shown. In this case, since the pulse voltage levels of the magnetic materials vary in accordance with the saturated magnetic flux densities Bs of the materials, even though the cross-sectional areas of the materials are identical with each other, it is possible to effectively attain the function of an identifying marker. For example, a Co base amorphous magnetic alloy can exhibit a desired magnetic characteristic by suitably selecting the material components or the conditions of heat treatment. However, if sufficient differences in the pulse voltage level cannot be obtained by relying only on the differences in saturated magnetic flux density among the magnetic materials, the cross-sectional areas can be changed, in addition, so as to obtain pulse voltage trains sufficient for the recognition of patterns.

In the case of Co base amorphous magnetic alloy strips having such a shape or a length-to-width ratio that the length is not sufficiently long relative to the width, the magnetic permeability thereof is lowered due to the demagnetizing field during magnetization, and therefore the speed of magnetization reversal becomes low. In this case, since normal square Φ−H curves as mentioned above cannot be obtained, the material components and the conditions of heat treatment can be suitably selected so as to give Φ−H curves as shown in FIGS. 17(a) to 17(a) for thin strip materials L, M and N. FIG. 17(d) shows the pulse output pattern of thin strip materials L, M and N when exposed to the magnetic field shown in FIG. 17(d). Pulse voltages can be generated by utilizing the magnetic flux jumping characteristics shown in FIGS. 17(a)-17(c) by suitably selecting the length-to-width ratios of the strip materials so as to give an effect similar to that having a normal square magnetic hysteresis characteristic.

Examples of the magnetic marker according to the present invention have been explained, in which thin magnetic strips having different magnetic flux values are selected by changing the cross-sectional areas or saturated magnetic flux densities of a plurality of magnetic materials having different coercive forces. Further, one can consider increasing the number of thin magnetic strips used in each row so as to increase the cross-sectional area thereof. However, if one thin magnetic strip is composed of a plurality of magnetic materials, even though they have one and the same magnetic characteristic, the abrupt reversal of magnetization of the square $\phi-H$ characteristics may possibly be shifted in time)although the shift would be slight. As a result, the pulse voltages would exhibit chronological shifts, causing errors in pattern recognition. Accordingly, as mentioned above, it is desirable for the thin magnetic strips to use the same material for each magnetic marker while changing the cross-sectional areas thereof.

Incidentally, in use of the magnetic marker according to the present invention, if noise occurs in the voltage pulse train, the voltage pulse train should be detected for at least several tens of cycles during the magnetic marker passage over the detecting area of a.c. magnetic field, so that the detected voltage levels may be averaged to eliminate errors due to the noise. Further, it has been explained that the voltage pulse train is detected by the detecting coils 10. However it is possible to use a highly sensitive magnetic field sensor as a means for detecting variations in leakage flux produced from the magnetic marker 1. When a magnetic field sensor is used for the detection, a differential type should be used for eliminating the effect by the a.c. magnetic field, with the result of a step-like detection output similar to the integrating method as shown in FIGS. 12(b)-12(d).

If the magnetic materials constituting the magnetic marker according to the present invention have different coercive forces with, square $\phi-H$ characteristics while providing a low degree of jitter in the detected pulse voltage, and if the pulse voltage can be chronologically detected and identified, such magnetic materials can be satisfactorily used. In particular, a Co base amorphous magnetic alloy has excellent magnetic characteristics and anti-corrosion capability while magnetostriction is low, and has the advantage that the detection outputs are relatively unaffected by external stress. Therefore a Co base amorphous magnetic alloy is suitable for a magnetic marker applied to an object to be detected, by forming thin strips. Naturally, fine wires can be used instead of the thin strips mentioned above.

If fine magnetic wires are used for a magnetic marker, it is possible to make the size of the marker smaller by utilizing pulse voltage due to extremely abrupt reversals of magnetization of high magnetostriction type Fe base amorphous alloy wires, in addition to Co base amorphous alloy wires. The use of such magnetic fine wires as materials for the magnetic marker will be explained hereinbelow.

Amorphous magnetic wires are normally produced by a spinning process in rotating liquid, and a typical diameter would be about 130 $\mu$m. This wire has high residual compression stress and torsional stress in its outer surface part during solidification under ultra-cooling. This quality can be easily obtained, particularly in an Fe base amorphous wire having a high strength and a high magneto-striction constant. Further, it is possible to produce wires each having a two layer structure in which the stress distributions of the surface layer and the core layer are remarkably different from each other due to a drawing process and heat-treatment under tension thereafter.

When such amorphous magnetic fine wires are used for a magnetic marker, a high tension exists in the core layer in the vicinity of the center of each wire so that the energy density of the domain wall becomes high. As a result, the critical field H* of magnetic flux reversal becomes larger so as to exhibit a large Barkhausen effect upon reversal of the magnetic flux, and steep pulse voltages are obtained in the detecting coils.

By the way, since the speed of magnetic flux reversal is affected by a demagnetizing field which is determined by the shape of the magnetic materials, an amorphous wire of sufficiently long length greater than the diameter thereof, such as 130 $\mu$m as mentioned above, by more than 7 cm is required for rapid magnetic flux reversal, resulting in a large size magnetic marker as a whole. However, as mentioned above, the Barkhausen effect can be made to be remarkable by suitably selecting the internal structure of the amorphous wire so that H* $-$Ho$\geq$Hd (where Ho is the domain wall displacement limit and Hd is the demagnetizing field), and therefore an abrupt magnetic flux reversal by the large Barkhausen effect can be dominant in particular. As a result, even if the amorphous fine wire has a relatively short length of 2 to 3 cm, it is possible to obtain abrupt induced voltage pulses. This can be accomplished by applying a high compressive stress to the outer layer of the each of Fe base amorphous fine magnetic wires by a drawing process and by heat treatment in a magnetic field under tension thereafter while axially magnetic anisotropy is induced in the core of the wire. Further, irregular stress simultaneously introduced during the drawing process can be removed to make the critical field H* of magnetic flux reversal clear. In the way it is possible to obtain a remarkable large Barkhausen effect.

Figures 18A, 18B:
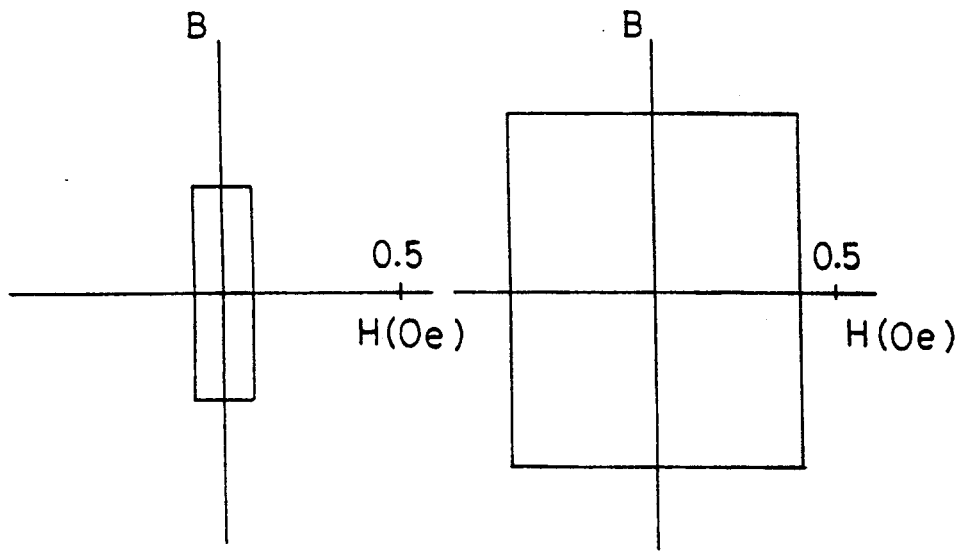
FIGS. 18(a) and 18(b) are explanatory diagrams illustrating B-H characteristic curves of a fine magnetic wire having two stress layers before and after processing and heat-treatment, respectively.
Figure 19:
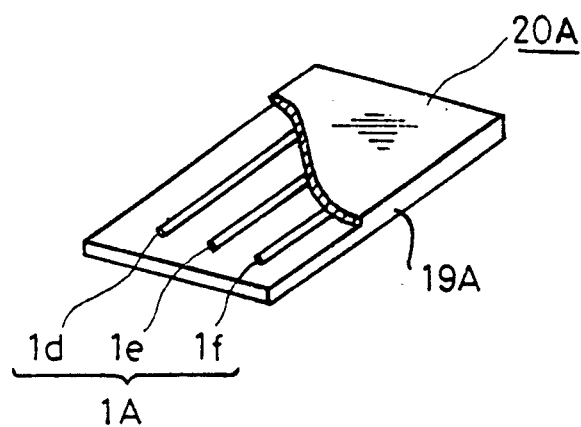
Figure 20A:
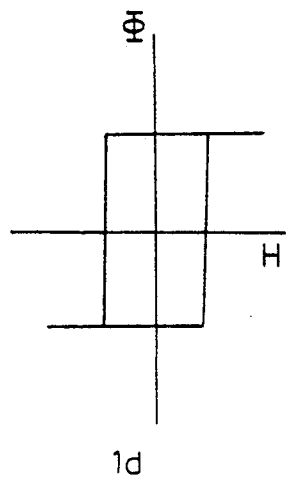
FIGS. 20(a)-20(c) illustrate Φ−H curves of the fine magnetic wires shown in FIG. 19, respectively.
Figure 20B:
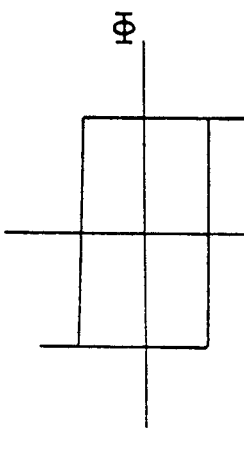
Figure 20C:
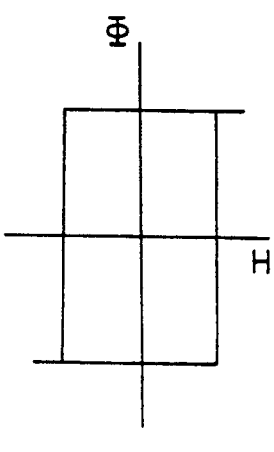
Figure 21A:
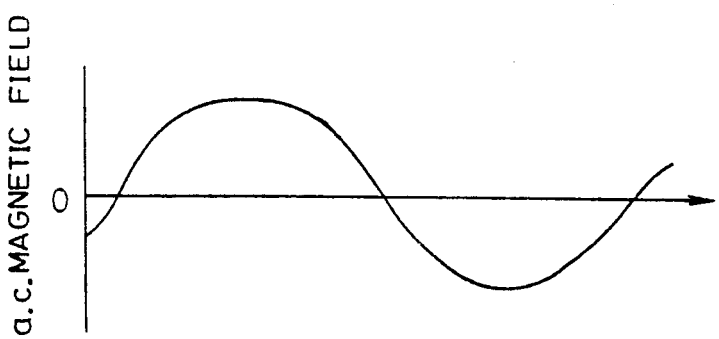
FIG. 21(a) illustrates an a.c. magnetic field waveform
Figure 21B:
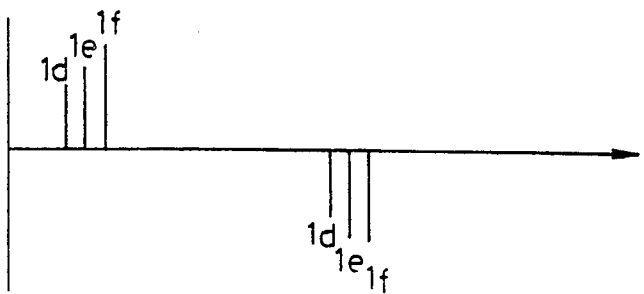
FIG. 21(b) is a voltage-time diagram illustrating pulse voltage trains produced in the detecting coil when detecting the magnetic marker shown in FIG. 19.

FIG. 18(a) and 18(b) show the magnetic flux density (B) -magnetic field (H) characteristics of Fe base amorphous fine wire so for purposed of comparison, FIG. 18(a) shows the characteristics of a wire directly obtained from a rapidly cooled condition and having a two layer stress structure after being processed and heat-treated. Further, FIG. 19 is a partly cutaway perspective view illustrating an element 20A to be detected in which a magnetic marker in with of magnetic fine wires 1d, 1e and 1f, each having a two layer stress structure and also having different critical fields H* of magnetic flux reversal, is applied on a fixing plate 19A. All these magnetic fine wires are 30 mm in length. The $\Phi-$H characteristics of these fine wires 1d, 1e and 1f are shown in FIGS. 20(a)-20(c). The critical fields H* of magnetic flux reversal and the saturated magnetic flux 100 max of the magnetic fine wires 1d, 1e and 1f can be made different from each other by changing the wire drawing rates and heat treatment conditions. FIG. 21(a) shows an a.c. magnetic field generated by the exciting coils and FIGS. 21(b) shows voltage pulses which are detected by the detecting coils 10 when the magnetic marker shown in FIG. 19 is used, with identical reference numerals being employed for denoting the outputs corresponding to the magnetic fine wires 1d, 1e and 1f, respectively, for convenience. The same method as that explained with respect to the thin magnetic strips can be applied for identifying the kind of the magnetic marker 1A by subjecting a voltage pulses train detected by the detecting coils 10 to signal processing such as 1d/1d, 1e/1e, 1f/1f or the like, in the measuring instrument 8 so as to form a voltage pulse train in a certain pattern.

Incidentally, as to the magnetic marker 1A using a plurality of magnetic fine wires having a two-layer-stress-structure, several combinations of the magnetic fine wires can be considered by changing the critical field H* of magnetic flux reversal and the cross-sectional area of each of the magnetic fine wires so as to change the amount of magnetic flux. This embodiment can be processed similar to the case of the a magnetic marker 1 using the above-mentioned thin magnetic strips, and therefore, the explanation thereof is omitted. As mentioned above, when amorphous magnetic fine wires are used, it is possible to provide a magnetic marker for identifying a relatively small article.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A magnetic marker adapted to be applied on an object to be detected passing through an a.c. magnetic field, comprising: a plurality of long and narrow magnetic fine wires which are disposed in a longitudinal direction, said magnetic fine wires being produced by drawing amorphous magnetic material and by heat treating the drawn amorphous magnetic material under tension, each of said magnetic fine wires having a layered stress structure which includes an outer surface layer in which compressive stress exists and a core in which tensile stress exists, said outer surface layer being concentric to said core, said magnetic fine wires having square magnetic hysteresis characteristics and magnetic flux jumping characteristics and also at least having magnetic coercive forces which are different from each other, said magnetic fine wires being arranged in a direction orthogonal to the longitudinal direction thereof at predetermined intervals.

2. A magnetic marker as set forth in claim 1, wherein said plurality of long and narrow magnetic fine wires include those having equal magnetic flux upon application of said a.c. magnetic field.

3. A magnetic marker as set forth in claim 1, wherein said plurality of long and narrow magnetic fine wires include those having equal magnetic flux upon application of said a.c. magnetic field.

4. A magnetic marker as set forth in claim 3, wherein said plurality of long and narrow magnetic fine wires having saturated magnetic flux densities which are equal to each other but have cross-sectional areas which are different from each other.

5. A magnetic marker as set forth in claim 3, wherein said plurality of long and narrow magnetic fine wires have cross-sectional areas which are equal to each other bu t have saturated magnetic flux densities which are different from each other.

6. A magnetic marker adapted to be applied on an object to be detected passing through an a.c. magnetic field, comprising: at least one fine wire made of amorphous magnetic material, the at least fine wire having magnetic properties and a layered stress structure which are produced by drawing the amorphous magnetic material and by heat treating the drawn amorphous magnetic material under tension, the layered stress structure of the at least one fine wire including an outer surface layer in which compressive stress exists and a core in which tensile stress exists.

7. A magnetic marker as claimed in claim 6, wherein the heat treating of the drawn amorphous magnetic material under tension is conducted in a magnetic field.

8. A magnetic marker as claimed in claim 6, wherein the marker includes a plurality of fine wires made of amorphous magnetic material, the fine wires having magnetic coercive forces which are different from one another.

9. A magnetic marker as claimed in claim 8, wherein the fine wires have lengths that are not greater than about three centimeters.

10. A magnetic marker as claimed in claim 6, wherein the at least one fine wire has a length that is not greater than about three centimeters.

11. A method for making a magnetic marker for use on an object that is to be passed through an a.c. magnetic field, comprising the steps of:
   (a) making a fine wire by drawing amorphous magnetic material;
   (b) heat treating the fine wire under tension; and
   (c) mounting a segment of the fine wire on a substrate.

12. The method of claim 11, wherein step (b) is conducted in a magnetic filed.

13. The method of claim 11, further comprising the steps of making at least one additional fine wire by drawing amorphous magnetic material, heat treating the at least one additional fine wire under tension, and mounting a segment of the at least one additional fine wire on the substrate, the fine wires mounted on the substrate having magnetic coercive forces which are different from one another.

14. The method of claim 13, wherein the step of heat treating the at least one additional fine wire under tension is conducted in a magnetic field.

15. The method of claim 13, wherein the step (c) and the step of mounting a segment of the at least one additional fine wire on the substrate are conducted by mounting fine wire segments having lengths that are not greater than about three centimeters.

16. A magnetic marker made by the method of claim 11.

* * * * *